United States Patent
Kang et al.

(10) Patent No.: US 12,522,968 B2
(45) Date of Patent: Jan. 13, 2026

(54) DRIVE SYSTEM OF A WASHING MACHINE

(71) Applicant: LG Electronics Inc., Seoul (KR)

(72) Inventors: Joohang Kang, Seoul (KR); Youngchan Ahn, Seoul (KR); Junggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 18/242,881

(22) Filed: Sep. 6, 2023

(65) Prior Publication Data

US 2024/0133106 A1 Apr. 25, 2024
US 2024/0229327 A9 Jul. 11, 2024

(30) Foreign Application Priority Data

Oct. 21, 2022 (KR) .......................... 10-2022-0136388

(51) Int. Cl.
*D06F 37/36* (2006.01)
*F16H 3/44* (2006.01)

(52) U.S. Cl.
CPC .............. *D06F 37/36* (2013.01); *F16H 3/44* (2013.01); *F16H 2200/2007* (2013.01); *F16H 2200/2051* (2013.01)

(58) Field of Classification Search
CPC ...................................................... D06F 37/36
See application file for complete search history.

(56) References Cited

U.S. PATENT DOCUMENTS 5,887,458 A 3/1999 Bae

FOREIGN PATENT DOCUMENTS

| KR | 10-2001-0100438 A | 11/2001 |
| KR | 10-1885203 B1 | 8/2018 |
| KR | 10-1920812 | 11/2018 |
| KR | 10-2020-0089604 | 7/2020 |
| WO | WO 2015/161581 | 10/2015 |
| WO | WO 2018/208003 | 11/2018 |

OTHER PUBLICATIONS

Office Action in Korean Appln. No. 10-2022-0136388, mailed on Nov. 11, 2024, 24 pages.
Extended European Search Report in European Appln. No. 23189429.6, mailed on Dec. 20, 2023, 7 pages.

*Primary Examiner* — Jason Y Ko
(74) *Attorney, Agent, or Firm* — Fish & Richardson P.C.

(57) ABSTRACT

A drive system of a washing machine includes a housing, a motor, a rotor shaft coupled to the motor and the housing, an output shaft having a part within the rotor shaft and coupled to the housing, a planetary gear set coupled to the rotor shaft and the output shaft, and an actuator configured to move the planetary gear set in a vertical direction. When the planetary gear set is moved to one side, a part of the planetary gear set is coupled to the rotor shaft to transmit a rotational force of the rotor shaft to the output shaft at a ratio of 1:1. When the planetary gear set is moved to other side, another part of the planetary gear set is coupled to the housing to reduce the rotational force of the rotor shaft at a gear ratio of n:1 and transmit it to the output shaft.

20 Claims, 20 Drawing Sheets

DRIVE SYSTEM OF A WASHING MACHINE

CROSS-REFERENCE TO RELATED APPLICATION

This application claims priority to and the benefit of Korean Patent Application No. 10-2022-0136388, filed in the Korean Intellectual Property Office, on Oct. 21, 2022, the entire contents of which are incorporated herein by reference.

BACKGROUND OF THE INVENTION

Field of the Invention

The present disclosure relates to a drive system of a washing machine, more specifically, to a drive system of a washing machine having a planetary gear clutch that operates mechanically.

Description of the Related Art

The washing machine is driven in two main operating modes (washing mode and spin-drying mode) with different operating conditions.

Therefore, in order to satisfy both of the above two main operating modes, the washing machine is provided with a planetary gear set and a clutch, and operates an output shaft at low speed and high torque with a gear ratio of n:1 (washing mode), or operates the output shaft at high speed and low torque with a gear ratio of 1:1 (spin-drying mode).

Here, the output shaft refers to a shaft coupled to a drum to rotate the drum. The drum may be referred to as the "inner tub".

That is, in a normal washing machine, after the washing mode or the rinsing mode is ended, the motor is temporarily stopped, and a draining operation is performed. And, after the draining operation ends, a spin-drying initial mode starts.

However, since high torque is required to initially start wet laundry in the spin-drying initial mode, the output shaft must be operated at low speed and high torque.

In addition, in order to start the spin-drying mode after the spin-drying initial mode is completed, the output shaft must be operated at high speed and low torque.

Therefore, the drive system of the washing machine includes parts for shifting a rotational force of the rotor shaft transmitted to the output shaft between the spin-drying initial mode and the spin-drying mode, for example, a planetary gear set and a clutch.

As an example of a related art related to the present disclosure, Korean Patent Publication No. KR10-2020-0089604 (hereinafter referred to as "Related Art 1") discloses a structure for changing a gear ratio by installing a planetary gear set including carriers, sun gears, multiple satellite gears, internal gears, etc. in a rotor case and changing the position of the internal gear by a solenoid clutch.

That is, in the case of Related Art 1, the washing machine is operated at low speed and high torque by allowing the internal gear to be supported by the stator through the slider of the solenoid clutch in the spin-drying initial mode, and by allowing rotations of the rotor shaft and the sun gear to be transmitted to the output shaft through the planetary gear set.

In addition, the washing machine is operated at high speed and low torque by allowing the internal gear to be supported on the rotor shaft through the slider of the solenoid clutch in the spin-drying mode, and by allowing rotations of the rotor shaft and the sun gear to be transmitted to the output shaft without going through the planetary gear set.

However, according to the drive system disclosed in Related Art 1, since a larger coil is required to obtain sufficient electromagnetic force to move the solenoid clutch, there is a problem in that the weight and volume of the solenoid clutch increases.

In addition, since the solenoid clutch is positioned behind the rotor and the stator, it is disadvantageous to secure the volume of the washing machine, and in order to apply power to the solenoid clutch, a separate circuit must be configured and wired between the rotor and the stator, so that there are problems such as difficult wiring work.

As another example of a related art related to present disclosure, Korean Patent Registration Publication No. KR10-1920812 (hereinafter referred to as "Related Art 2") discloses a structure for changing a gear ratio while moving the position of a deceleration coupling unit including the planetary gear set forward and backward using a lever.

That is, in the case of Related Art 2, in the spin-drying initial mode, the deceleration coupling unit is moved forward according to the operation of the lever of the lever unit, and accordingly, teeth formed on the coupling cap of the deceleration coupling unit are engaged with teeth formed on the drum, so that the washing machine is operated at low speed and high torque.

In the spin-drying mode, the deceleration coupling unit is moved backward according to the operation of the lever of the lever unit, and accordingly, teeth formed on the coupling housing of the deceleration coupling unit are engaged with teeth formed on the rotor housing, so that the washing machine is operated at high speed and low torque.

However, according to the driving system disclosed in Related Art 2, since the pinion gear provided in the carrier of the deceleration coupling unit must move in the axial direction with respect to the sun gear, only the spur gear, not helical gears, can be used as the pinion gear and the sun gear, and there is a problem in that noise is generated due to this.

In addition, since the forward and backward movement of the deceleration coupling unit is possible only while the motor is stopped, there is a problem in that the motor must be stopped for mode conversion.

In addition, the sun gear provided in the planetary gear set is mounted on a bearing on the output shaft, and the output shaft is supported by only one bearing.

Therefore, in the spin-drying initial mode, the planetary gear set serves as a support point, so that the output shaft is supported by the planetary gear set and the bearing, but in the spin-drying mode, since the rotor, the planetary gear set, and the output shaft operate as one, and the output shaft is supported by only one bearing, there is a problem of low durability in the spin-drying mode operating at high speed and low torque.

Prior Technical Literature

Patent Document (Patent Document 0001) Related Art 1: Korean Patent Publication No. KR10-2020-0089604
(Patent Document 0002) Related Art 2: Korean Patent Registration Publication No. KR10-1920812

SUMMARY OF THE INVENTION

A problem to be solved by the present disclosure is to provide a drive system of a washing machine capable of implementing a washing mode and a spin-drying mode by moving the entire planetary gear set without a stop operation between ending washing and starting spin-drying.

In addition, a problem to be solved by the present disclosure is to provide a drive system of a washing machine capable of implementing low-speed and high-torque washing mode of n:1 since the rotation of the ring gear is stopped without additional parts.

In addition, a problem to be solved by the present disclosure is to provide a drive system of a washing machine capable of stably guiding the movement of the planetary gear set with respect to the output shaft.

In addition, a problem to be solved by the present disclosure is to provide a drive system of a washing machine capable of implementing high-speed and low-torque spin-drying mode of 1:1 since the plurality of pinion gears and the rotor shaft are synchronized.

In addition, a problem to be solved by the present disclosure is to provide a drive system of a washing machine capable of stably guiding the movement of the planetary gear set with respect to the rotor shaft.

In addition, a problem to be solved by the present disclosure is to provide a drive system of a washing machine capable of increasing the safety factor of the gears provided in the planetary gear set, and reducing the noise generated during gear rotation.

In addition, a problem to be solved by the present disclosure is to provide a drive system of a washing machine capable of increasing the space efficiency of the washing machine since the length in the axial direction can be reduced.

In addition, a problem to be solved by the present disclosure is to provide a drive system of a washing machine capable of preventing parts from being damaged when the rotational speeds of the rotor shaft and the output shaft are different.

In addition, a problem to be solved by the present disclosure is to provide a drive system of a washing machine capable of moving the entire planetary gear set while improving space efficiency.

In addition, a problem to be solved by the present disclosure is to provide a drive system of a washing machine capable of improving rotational stability of the output shaft since two bearings support the output shaft connected to the washing machine tub.

A drive system of a washing machine according to one aspect of the present disclosure for achieving the above object includes a housing, a motor disposed on one side of the housing, a rotor shaft coupled to the motor and bearing-coupled to the housing, an output shaft bearing-coupled to the housing, and wherein at least part of the output shaft is disposed in the rotor shaft, a planetary gear set that a part of the planetary gear set is spline-coupled to the rotor shaft, and other part of the planetary gear set is spline-coupled to the output shaft, and an actuator moving the planetary gear set in a vertical direction.

In this case, when the planetary gear set is moved to one side, a part of the planetary gear set may be coupled to the rotor shaft to transmit a rotational force of the rotor shaft to the output shaft at a ratio of 1:1, and when the planetary gear set is moved to other side, another part of the planetary gear set may be coupled to the housing to reduce and transmit the rotational force of the rotor shaft to the output shaft at a gear ratio of n:1.

Through this, it is possible to implement a washing mode and a spin-drying mode by moving the entire planetary gear set without a stop operation between ending washing and starting spin-drying.

In addition, the planetary gear set may include a sun gear spline-coupled to the rotor shaft, a plurality of pinion gears coupled to an outer circumferential surface of the sun gear and spaced apart in a circumferential direction, a ring gear that an inner circumferential surface of the ring gear coupled to the plurality of pinion gears, and a carrier coupled to the plurality of pinion gears.

In this case, the ring gear may include a first clutch portion formed on an upper surface of the ring gear, and the housing may include a second clutch portion coupled to the first clutch portion when the planetary gear set is moved to the other side.

Through this, since the rotation of the ring gear is stopped without additional parts, it is possible to implement low-speed and high-torque washing mode of n:1.

In addition, the carrier may include a first carrier disposed on the plurality of pinion gears, a second carrier disposed under the plurality of pinion gears, and a plurality of connecting portions connecting each of the plurality of pinion gears to the first carrier and the second carrier.

In this case, the first carrier may include a first spline portion formed on an inner circumferential surface of the first carrier, and the output shaft may include a second spline portion formed on an outer circumferential surface of the output shaft and spline-coupled to the first spline portion.

Through this, it is possible to stably guide the movement of the planetary gear set with respect to the output shaft.

In addition, the second carrier may include a third clutch portion formed on a lower surface of the second carrier, and the rotor shaft may include a fourth clutch portion coupled to the third clutch portion when the planetary gear set is moved to the one side.

Through this, since the plurality of pinion gears and the rotor shaft are synchronized, it is possible to implement high-speed and low-torque spin-drying mode of 1:1.

In addition, the sun gear may include a third spline portion formed on an inner circumferential surface of the sun gear, and the rotor shaft may include a fourth spline portion formed on an outer circumferential surface of the rotor shaft and spline-connected to the third spline portion.

Through this, it is possible to stably guide the movement of the planetary gear set with respect to the rotor shaft.

In addition, the sun gear, the plurality of pinion gears, and the ring gear may include helical gears.

Through this, it is possible to increase the safety factor of the gears provided in the planetary gear set, and reduce the noise generated during gear rotation.

In addition, the present disclosure further includes a first bearing disposed between the output shaft and the housing, and a second bearing disposed between the rotor shaft and the housing, In this case, the planetary gear set may be disposed between the first bearing and the second bearing.

Through this, since the length in the axial direction can be reduced, it is possible to increase the space efficiency of the washing machine.

In addition, the present disclosure may further include a bushing disposed between the at least part of the output shaft and the rotor shaft.

Through this, it is possible to prevent parts from being damaged when the rotational speeds of the rotor shaft and the output shaft are different.

In addition, the ring gear may include a groove formed on an outer circumferential surface of the ring gear, and wherein the actuator is disposed on the groove.

Through this, it is possible to move the entire planetary gear set while improving space efficiency.

A drive system of a washing machine according to one aspect of the present disclosure for achieving the above object includes a housing, a motor disposed on one side of the housing, a rotor coupled to the motor, an output shaft bearing-coupled to the housing, and wherein at least part of the output shaft is disposed within the rotor, a planetary gear set that a part of the planetary gear set is spline-coupled to the rotor, and other part of the planetary gear set is spline-coupled to the output shaft, and an actuator moving the planetary gear set in a vertical direction.

In this case, when the planetary gear set is moved to one side, a part of the planetary gear set may be coupled to the rotor to transmit a rotational force of the rotor to the output shaft at a ratio of 1:1, and when the planetary gear set is moved to other side, another part of the planetary gear set may be coupled to the housing to reduce and transmit the rotational force of the rotor to the output shaft at a gear ratio of n:1.

Through this, it is possible to implement a washing mode and a spin-drying mode by moving the entire planetary gear set without a stop operation between ending washing and starting spin-drying.

In addition, the planetary gear set may include a sun gear spline-coupled to the rotor, a plurality of pinion gears coupled to an outer circumferential surface of the sun gear and spaced apart in a circumferential direction, a ring gear that an inner circumferential surface of the ring gear coupled to the plurality of pinion gears, and a carrier coupled to the plurality of pinion gears.

In this case, the ring gear may include a fifth clutch portion formed on an upper surface of the ring gear, and the housing may include a sixth clutch portion coupled to the fifth clutch portion when the planetary gear set is moved to the other side.

Through this, since the rotation of the ring gear is stopped without additional parts, it is possible to implement low-speed and high-torque washing mode of n:1.

In addition, the carrier may include a third carrier disposed on the plurality of pinion gears, a fourth carrier disposed under the plurality of pinion gears, and a plurality of connecting portions connecting each of the plurality of pinion gears to the third carrier and the fourth carrier.

In this case, the third carrier may include a fifth spline portion formed on an outer circumferential surface of the third carrier, and the output shaft may include a first region disposed in the planetary gear set, a second region disposed on the first region, a protrusion protruding downward from a lower surface of the second region and spaced apart from the first region, and a sixth spline portion formed on an inner circumferential surface of the protrusion and spline-coupled to the fifth spline portion.

Through this, it is possible to stably guide the movement of the planetary gear set with respect to the output shaft.

In addition, the present disclosure may further include a third bearing disposed between the second region and the housing, and a fourth bearing disposed between the protrusion and the housing, In this case, the planetary gear set may be disposed under the fourth bearing.

Through this, since two bearings support the output shaft connected to the washing machine tub, it is possible to improve rotational stability of the output shaft.

In addition, the ring gear may include a seventh clutch portion formed on a lower surface of the ring gear, and the rotor may include an eighth clutch portion coupled to the seventh clutch portion when the planetary gear set is moved to the one side.

Through this, since the ring gear and the rotor are synchronized, it is possible to implement high-speed and low-torque spin-drying mode of 1:1.

In addition, the sun gear may include a seventh spline portion formed on an outer circumferential surface of the sun gear, and the rotor may include an eighth spline portion formed on an inner circumferential surface of the rotor and spline-connected to the seventh spline portion.

Through this, it is possible to stably guide the movement of the planetary gear set with respect to the rotor.

In addition, the sun gear, the plurality of pinion gears, and the ring gear may include helical gears.

Through this, it is possible to increase the safety factor of the gears provided in the planetary gear set, and reduce the noise generated during gear rotation.

In addition, the ring gear may include a groove formed on an outer circumferential surface of the ring gear, and wherein the actuator is disposed on the groove.

Through this, it is possible to move the entire planetary gear set while improving space efficiency.

Through the present disclosure, it is possible to provide the drive system of the washing machine capable of implementing a washing mode and a spin-drying mode by moving the entire planetary gear set without a stop operation between ending washing and starting spin-drying.

In addition, through the present disclosure, since the rotation of the ring gear is stopped without additional parts, it is possible to provide the drive system of the washing machine capable of implementing low-speed and high-torque washing mode of n: 1.

Through the present disclosure, it is possible to provide the drive system of the washing machine capable of stably guiding the movement of the planetary gear set with respect to the output shaft.

In addition, through the present disclosure, since the plurality of pinion gears and the rotor shaft are synchronized, it is possible to provide the drive system of the washing machine capable of implementing high-speed and low-torque spin-drying mode of 1:1.

In addition, through the present disclosure, it is possible to provide the drive system of the washing machine capable of stably guiding the movement of the planetary gear set with respect to the rotor shaft.

In addition, through the present disclosure, it is possible to provide the drive system of the washing machine capable of increasing the safety factor of the gears provided in the planetary gear set, and reducing the noise generated during gear rotation.

In addition, through the present disclosure, since the length in the axial direction can be reduced, it is possible to provide the drive system of the washing machine capable of increasing the space efficiency of the washing machine.

In addition, through the present disclosure, it is possible to provide the drive system of the washing machine capable of preventing parts from being damaged when the rotational speeds of the rotor shaft and the output shaft are different.

In addition, through the present disclosure, it is possible to provide the drive system of the washing machine capable of moving the entire planetary gear set while improving space efficiency.

In addition, through the present disclosure, it is possible to provide the drive system of the washing machine capable of improving rotational stability of the output shaft since two bearings support the output shaft connected to the washing machine tub.

DETAILED DESCRIPTION OF THE EMBODIMENTS

Figure 1:
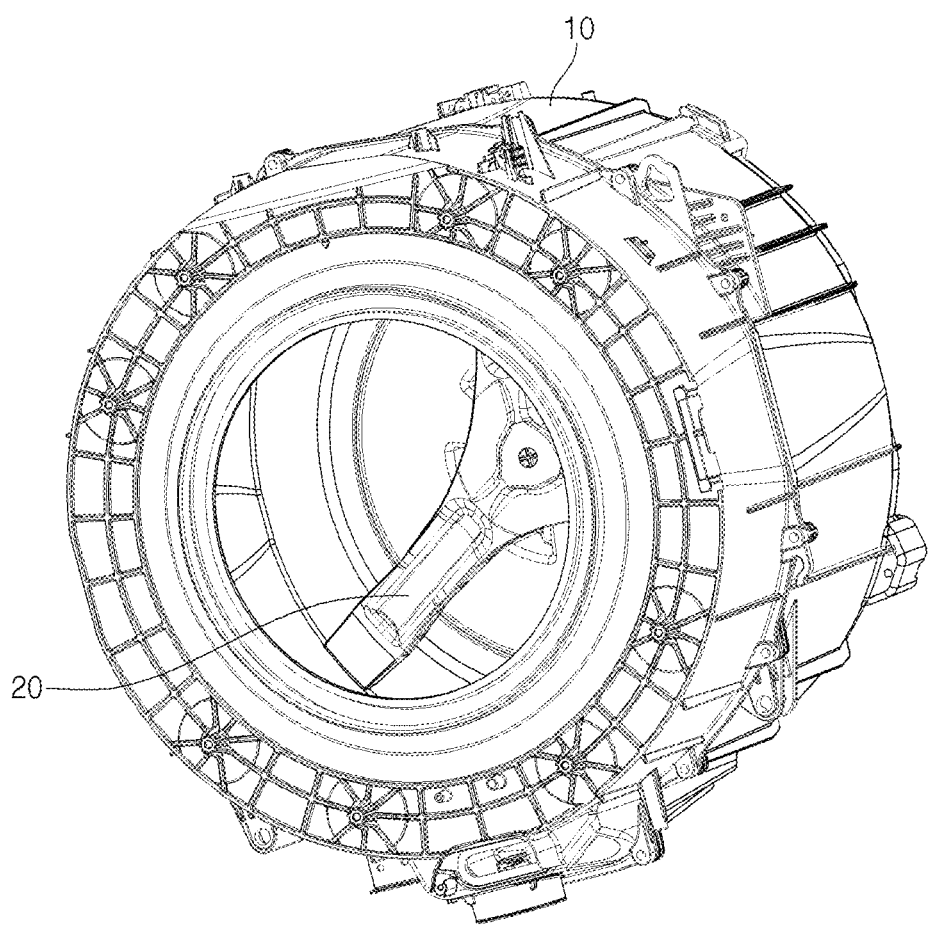
FIGS. 1 and 2 are perspective views of a tub of a washing machine and a drive system of a washing machine according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

Figure 2:
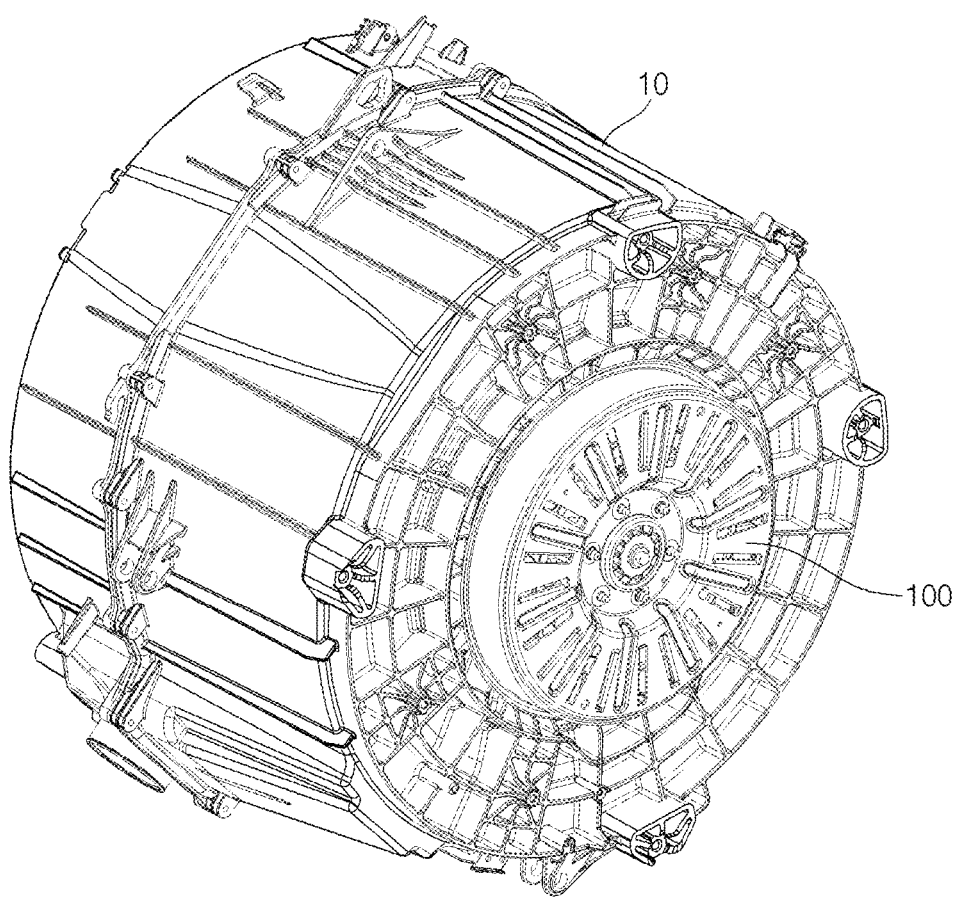
Figure 3:
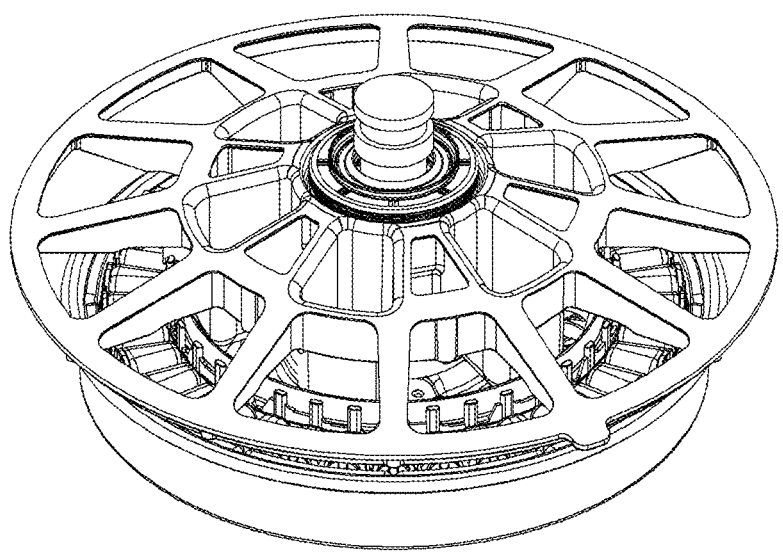
FIG. 3 is a perspective view of a drive system of a washing machine according to an embodiment of the present disclosure.
Figure 4:
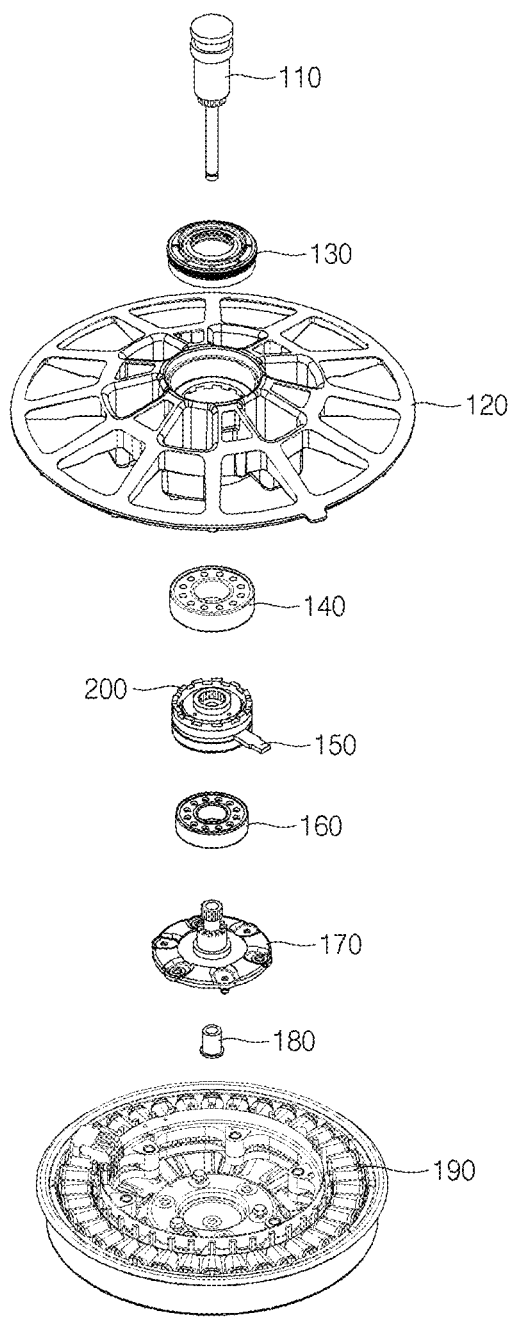
FIG. 4 is an exploded perspective view of a drive system of a washing machine according to an embodiment of the present disclosure.
Figure 5:
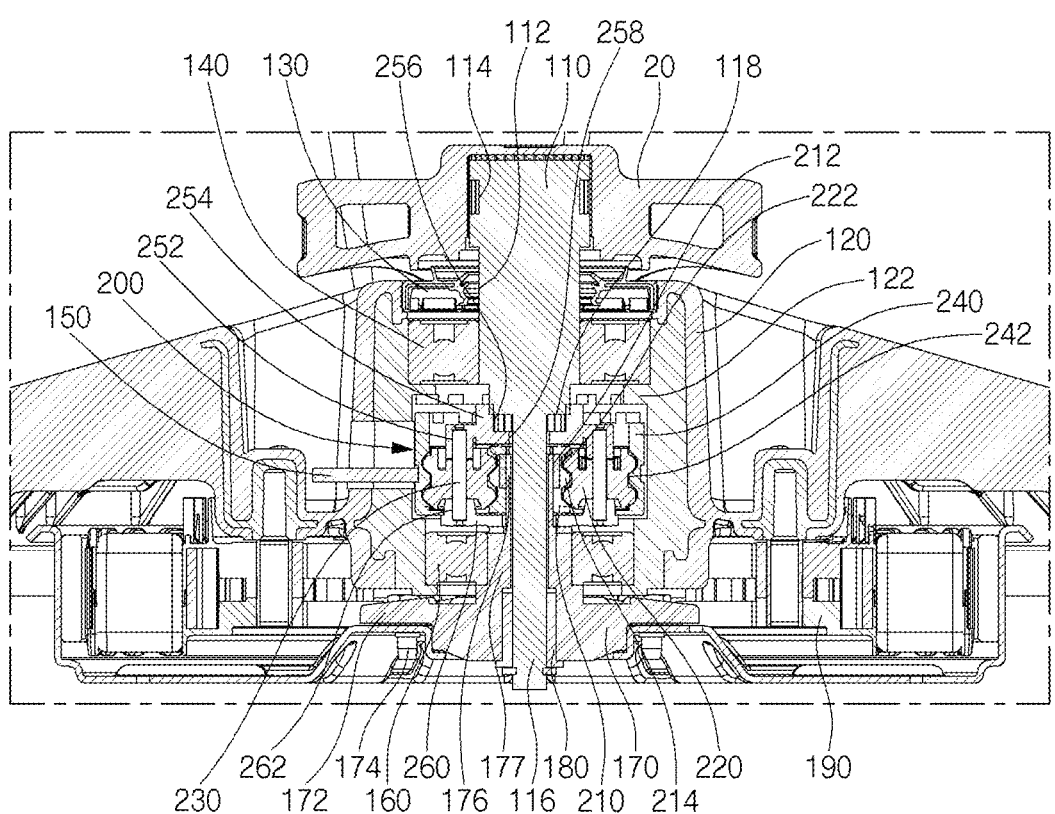
FIG. 5 is a cross-sectional view of a drive system of a washing machine according to an embodiment of the present disclosure.
Figure 6:
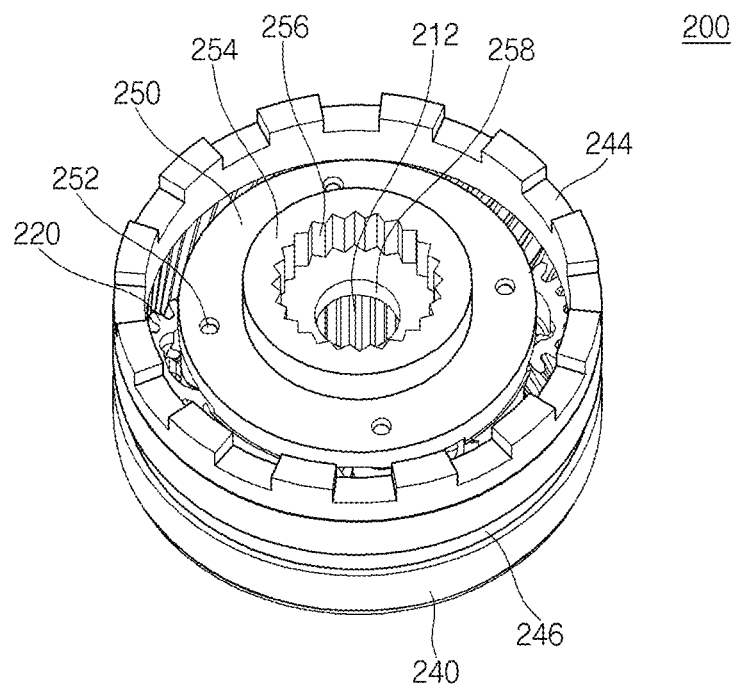
FIG. 6 is a perspective view of a planetary gear set of a drive system of a washing machine according to an embodiment of the present disclosure.
Figure 7:
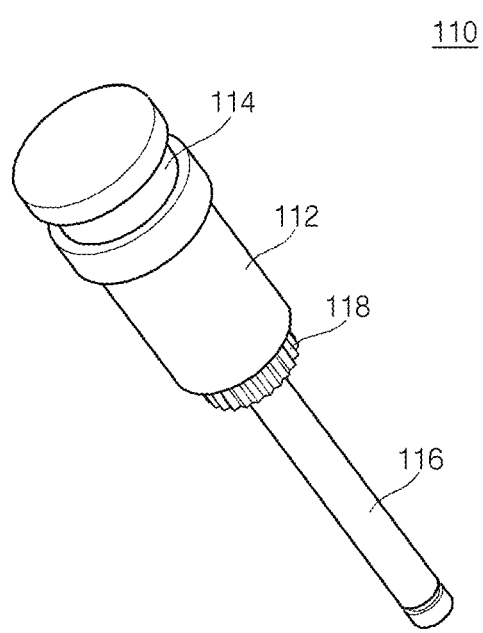
FIG. 7 is a perspective view of an output shaft of a drive system of a washing machine according to an embodiment of the present disclosure.
Figure 8:
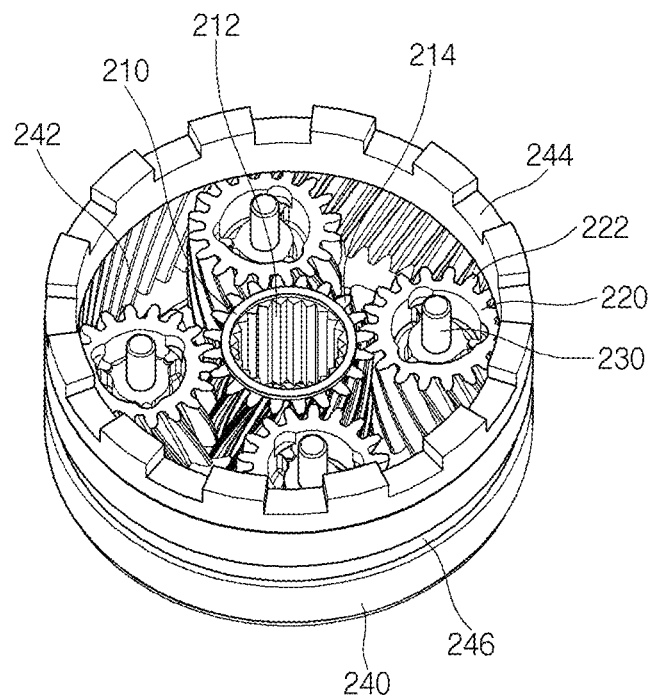
FIG. 8 is a view in which the first carrier is removed from FIG. 6.
Figure 9:
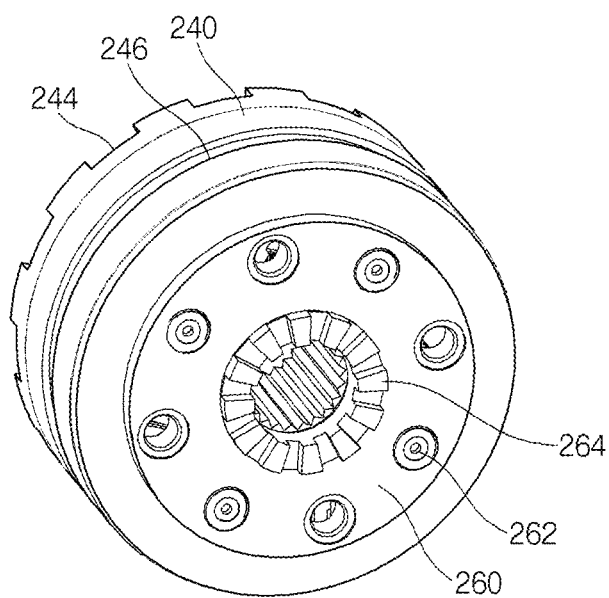
FIG. 9 is a perspective view of a planetary gear set of a drive system of a washing machine according to an embodiment of the present disclosure.
Figure 10:
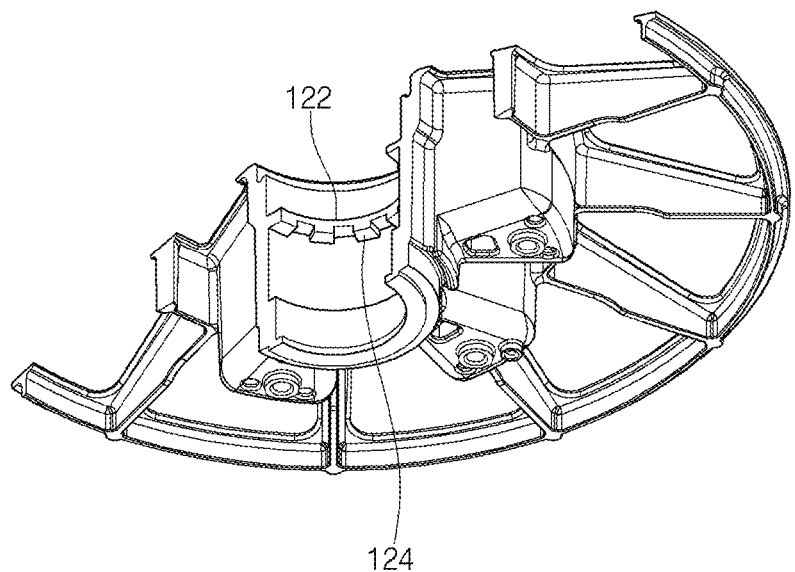
FIG. 10 is a cross-sectional perspective view of a housing of a drive system of a washing machine according to an embodiment of the present disclosure.
Figure 11:
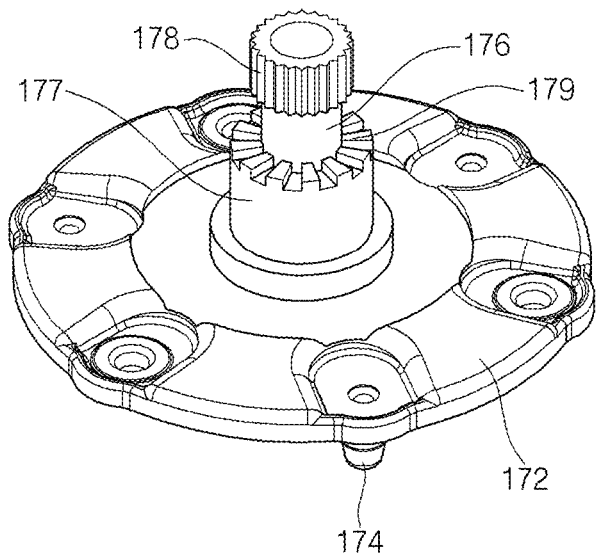
FIG. 11 is a perspective view of a rotor shaft of a drive system of a washing machine according to an embodiment of the present disclosure.

FIGS. 1 and 2 are perspective views of a tub of a washing machine and a drive system of a washing machine according to an embodiment of the present disclosure. FIG. 3 is a perspective view of a drive system of a washing machine according to an embodiment of the present disclosure. FIG. 4 is an exploded perspective view of a drive system of a washing machine according to an embodiment of the present disclosure. FIG. 5 is a cross-sectional view of a drive system of a washing machine according to an embodiment of the present disclosure. FIG. 6 is a perspective view of a planetary gear set of a drive system of a washing machine according to an embodiment of the present disclosure. FIG. 7 is a perspective view of an output shaft of a drive system of a washing machine according to an embodiment of the present disclosure. FIG. 8 is a view in which the first carrier is removed from FIG. 6. FIG. 9 is a perspective view of a planetary gear set of a drive system of a washing machine according to an embodiment of the present disclosure. FIG. 10 is a cross-sectional perspective view of a housing of a drive system of a washing machine according to an embodiment of the present disclosure. FIG. 11 is a perspective view of a rotor shaft of a drive system of a washing machine according to an embodiment of the present disclosure.

Referring to FIGS. 1 to 11, a washing machine according to an embodiment of the present disclosure may include an inner tub 10, a pulsator 20, and a drive system 100 of a washing machine, but it may be implemented except for some of these configurations, and does not exclude other additional configurations.

The washing machine according to an embodiment of the present disclosure may be a top loading type in which the center of rotation of the inner tub is formed in a direction perpendicular to the floor and it is designed for the laundry to be loaded from the top and a front loading type in which the center of rotation of the inner tub is formed in a direction horizontal to the floor or it is inclined in a downward direction toward the rear end and it is designed for the laundry to be loaded from the front.

The inner tub 10 may have a cylindrical shape open to the top or front. The pulsator 20 may be disposed on the bottom surface of the inner tub 10. The pulsator 20 may be connected to an output shaft 110 of the drive system 100 of the washing machine. The drive system 100 of the washing machine may be coupled to the inner tub 10 to rotate the pulsator 20.

The drive system 100 of the washing machine according to an embodiment of the present disclosure may include a housing 120, an output shaft 110, a first bearing 140, a second bearing 160, and a planetary gear set 200, an actuator 150, a rotor shaft 170, a motor 190, and a bushing 180, but may be implemented except for some of these configurations, and does not exclude other additional configurations.

The output shaft 110 may be rotatably disposed in the housing 120. The pulsator 20 may be disposed above the housing 120. The housing 120 may be coupled to the inner tub 10. The motor 190 may be disposed below the housing 120. The housing 120 may be coupled to the planetary gear set 200.

The housing 120 may include a second clutch portion 124. The second clutch portion 124 may protrude inward from an inner circumferential surface of the housing 120 and protrude downward from a circumferential portion 122 extending in a circumferential direction. The second clutch portion 124 may engage with a first clutch portion 244 of a ring gear 240 of the planetary gear set 200 when the planetary gear set 200 is moved to the top or the other side. The second clutch portion 124 may be formed in a shape complementary to that of the first clutch portion 244.

The output shaft 110 may extend in the axial direction. The output shaft 110 may be coupled to the pulsator 20. The output shaft 110 may be rotatably coupled to the housing 120. The output shaft 110 may be bearing-coupled to the housing 120. The output shaft 110 may be rotatably coupled to the rotor shaft 170 at the same speed or at different speeds. The output shaft 110 may be bushing-coupled to the rotor shaft 170.

The pulsator 20 may be coupled to an upper region 114 of the output shaft 110.

A central region 112 of the output shaft 110 may be bearing-coupled to the housing 120. The first bearing 140 may be disposed between the central region 112 of the output shaft 110 and the housing 120.

A lower region 116 of the output shaft 110 may be disposed within the rotor shaft 170. The lower region 116 of the output shaft 110 may be coupled to the rotor shaft 170. The bushing 180 may be disposed between the lower region 116 of the output shaft 110 and the rotor shaft 170. A diameter of the lower region 116 of the output shaft 110 may be smaller than a diameter of the central region 112. An axial length of the lower region 116 of the output shaft 110 may be longer than an axial length of the central region 112 of the output shaft 110. In one embodiment of the present disclosure, the axial direction may be interpreted as meaning a vertical direction based on FIGS. 3 to 5.

The output shaft 110 may include a second spline portion 118 formed on an outer circumferential surface. The second spline portion 118 may protrude outward from the outer circumferential surface of the output shaft 110. The second spline portion 118 may be disposed between the central region 112 and the lower region 116 of the output shaft 110. The second spline portion 118 may be spline-coupled to a first spline portion 256 of a first carrier 250 of the planetary gear set 200. Here, "a spline" may mean a cut groove on a shaft or a bore, and "a spline coupling" may mean a coupling so that perturbation in the axial direction is possible and rotation together is possible The first bearing 140 may be disposed between the housing 120 and the output shaft 110. The first bearing 140 may bearing-couple the output shaft 110 to the housing 120. The first bearing 140 may rotatably couple the output shaft 110 to the housing 120. The first bearing 140 may extend in the circumferential direction. The first bearing 140 may be disposed below a fifth bearing 130. The first bearing 140 may be disposed above the planetary gear set 200.

The second bearing 160 may be disposed between the rotor shaft 170 and the housing 120. The second bearing 160 may be disposed below the planetary gear set 200. The second bearing 160 may bearing-couple the rotor shaft 170 to the housing 120. The second bearing 160 may rotatably couple the rotor shaft 170 to the housing 120. The second bearing 160 may extend in the circumferential direction.

A part of the planetary gear set 200 may be spline-coupled to the rotor shaft 170, and another part may be spline-coupled to the output shaft 110. The planetary gear set 200 may be vertically moved by a first actuator 150.

When the planetary gear set 200 is moved to one side or lower part, a part of the planetary gear set 200 may be coupled to the rotor shaft 170. In this case, the rotational force of the rotor shaft 170 may be transmitted to the output shaft 110 at a 1:1 ratio.

When the planetary gear set 200 is moved to the other side or upper part, another part of the planetary gear set 200 may be coupled to the housing 120. In this case, the rotational force of the rotor shaft 170 may be reduced at a gear ratio of n:1 and transmitted to the output shaft 110.

Through this, it is possible to implement a washing mode and a spin-drying mode by moving the entire planetary gear set 200 without a stop operation between ending washing and starting spin-drying.

The planetary gear set 200 may include a sun gear 210, a plurality of pinion gears 220, a ring gear 240, a connection portion 230, and carriers 250 and 260.

The sun gear 210 may be spline-coupled to the rotor shaft 170. Specifically, a third spline portion 212 formed on an inner circumferential surface of the sun gear 210 may be spline-coupled to a fourth spline portion 178 formed on an outer circumferential surface of the rotor shaft 170. A first helical gear 214 may be formed on an outer circumferential surface of the sun gear 210.

The plurality of pinion gears 220 may be spaced apart from each other in the circumferential direction. Outer circumferential surfaces of the plurality of pinion gears 220 may be coupled to the outer circumferential surfaces of the sun gear 210, respectively. A second helical gear 222 may be formed on the outer circumferential surfaces of the plurality of pinion gears 220.

In one embodiment of the present disclosure, the number of the plurality of pinion gears 220 is four as an example, but the number of the plurality of pinion gears 220 may be variously changed without being limited thereto.

A plurality of connection portions 230 may be formed inside each of the plurality of pinion gears 220. The plurality of pinion gears 220 may be connected to the carriers 250 and 260 through the connection portion 230.

An inner circumferential surface of the ring gear 240 may be coupled to the plurality of pinion gears 220. A third helical gear 242 may be formed on the inner circumferential surface of the ring gear 240.

The ring gear 240 may include the first clutch portion 244 formed on an upper surface. The first clutch portion 244 may be coupled to the second clutch portion 124 of the housing 120. Specifically, when the planetary gear set 200 moves upward, the first clutch portion 244 may be coupled to the second clutch portion 124. In this case, rotation of the ring gear 240 may be stopped, and low-speed and high-torque washing mode of n:1 may be implemented according to a gear ratio between the sun gear 210 and the plurality of pinion gears 220.

The carriers 250 and 260 may be coupled to the plurality of pinion gears 220. The carriers 250 and 260 may be coupled to the plurality of pinion gears 220 through the connection portion 230.

The carriers 250 and 260 may include a first carrier 250 disposed above the plurality of pinion gears 220 and a second carrier 260 disposed below the plurality of pinion gears 220. The first carrier 250 and the second carrier 260 may be connected to the plurality of pinion gears 220 through the connection portion 230.

The first carrier 250 may include a first coupling hole 252 to which the plurality of connection portions 230 are coupled, a through hole 258 penetrated by the lower region 116 of the output shaft 110, a protrusion region 254 protruding upward from the upper surface, and the first spline portion 256 formed on an inner circumferential surface of the protruding region 254.

The first spline portion 256 of the first carrier 250 may be coupled to the second spline portion 118 of the output shaft 110. Through this, it is possible to stably guide the movement of the planetary gear set 200 with respect to the output shaft 110.

The second carrier 260 may include a second coupling hole 262 to which the plurality of connection portions 230 are coupled, and a third clutch portion 264 protruding downward from a lower surface.

The third clutch portion 264 may be coupled to a fourth clutch portion 179 of the rotor shaft 170. Specifically, when the planetary gear set 200 is moved downward, the third clutch portion 264 of the second carrier 260 of the planetary gear set 200 is coupled to the fourth clutch portion 179 of the rotor shaft 170 to rotate together. Through this, since the plurality of pinion gears 220 and the rotor shaft 170 are synchronized, it is possible to implement high-speed and low-torque spin-drying mode of 1:1

The first helical gear 214 may be formed on the outer circumferential surface of the sun gear 210, the second helical gear 222 may be formed on the outer circumferential surface of the plurality of pinion gears 220, and the third helical gear 242 may be formed on the inner circumferential surface of the ring gear 240. Since the planetary gear set 200 is moved in the vertical direction as a whole, a helical gear may be formed in the sun gear 210, the plurality of pinion gears 220, and the ring gear 240. Through this, it is possible to increase the safety factor of the gears provided in the planetary gear set 200, and reduce the noise generated during gear rotation.

The planetary gear set 200 may be disposed between the first bearing 140 and the second bearing 160. Through this, since the length in the axial direction in the drive system 100 of the washing machine can be reduced, it is possible to increase the space efficiency of the washing machine.

The ring gear 240 may include a groove 246 formed on an outer circumferential surface and in which the first actuator 150 is disposed. The groove 246 may extend in the circumferential direction. The entire planetary gear set 200 including the ring gear 240 may be moved in the vertical direction by the first actuator 150 disposed in the groove 246. Through this, it is possible to move the entire planetary gear set 200 in the vertical direction while improving space efficiency.

The first actuator 150 may move the planetary gear set 200 in the vertical direction. A detailed description of the first actuator 150 will be described later.

The rotor shaft 170 may be coupled to the motor 190. The rotor shaft 170 may be bearing-coupled to the housing 120. The rotor shaft 170 may be rotatably coupled to the housing 120 by the second bearing 160.

The rotor shaft 170 may include a flange portion 172 including a protrusion 174 coupled to the motor 190, a clutch region 177 protruding upward from a central region of the flange portion 172, the fourth clutch portion 179 formed on an upper surface of the clutch region 177, a spline region 176 protruding upward from the clutch region 177, and the fourth spline portion 178 protruding outward in the radial direction from an upper part of the spline region 176.

The fourth clutch portion 179 may be coupled to the third clutch portion 264 formed on a lower surface of the second carrier 260. Through this, when the planetary gear set 200 moves downward, the fourth clutch portion 179 is coupled to the third clutch portion 264 to rotate integrally.

The fourth spline portion 178 may be formed on the outer circumferential surface of the rotor shaft 170. Specifically, the fourth spline portion 178 may be formed on an outer circumferential surface of the spline region 176. The fourth spline portion 178 may be spline-coupled to the third spline portion 212 formed on the inner circumferential surface of the sun gear 210. Through this, it is possible to stably guide the movement of the planetary gear set 200 with respect to the rotor shaft 170.

The motor 190 may be disposed on one side of the housing 120. The motor 190 may be disposed below the housing 120. The motor 190 may be coupled to the rotor shaft 170. The motor 190 may receive power from the outside and rotate in one direction or the other direction to rotate the rotor shaft 170 in one direction or the other direction.

The fifth bearing 130 may be disposed between the output shaft 110 and the housing 120. The fifth bearing 130 may rotatably couple the output shaft 110 to the housing 120.

The bushing 180 may be disposed between at least a part of the output shaft 110 and the rotor shaft 170. The bushing 180 may be disposed between the lower region 116 of the output shaft 110 and the rotor shaft 170. Through this, it is possible to prevent parts from being damaged when the rotational speeds of the rotor shaft 170 and the output shaft 110 are different.

Figure 12:
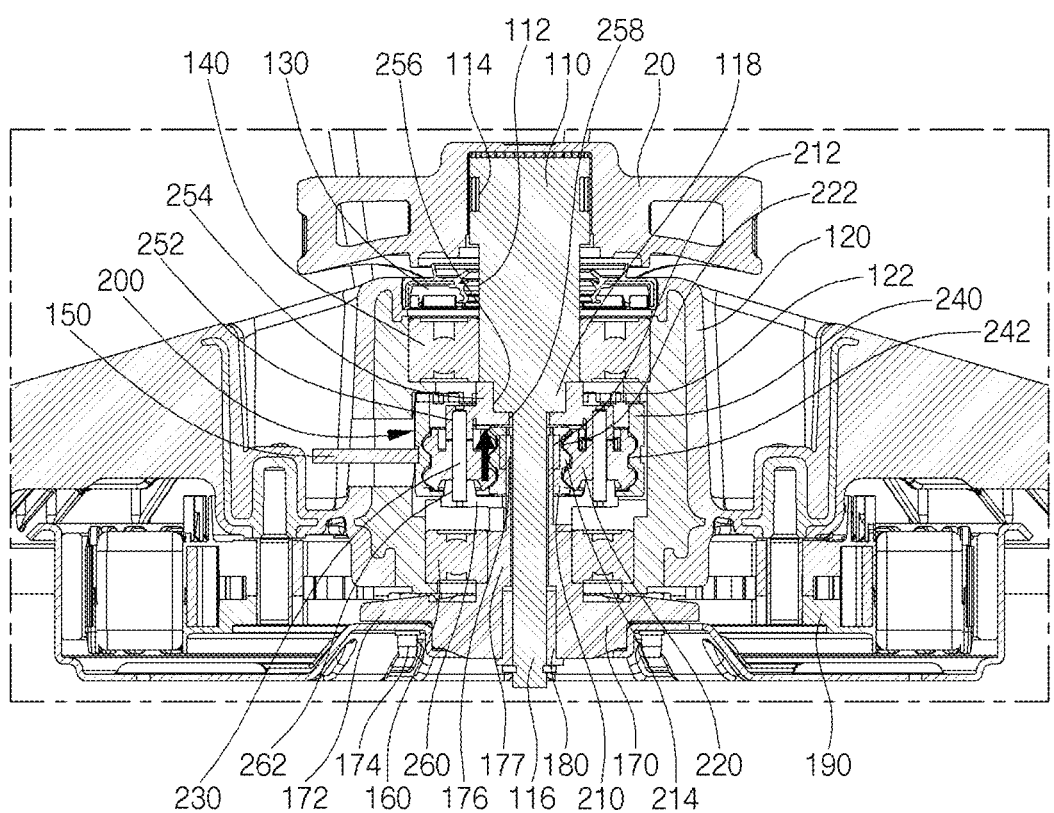
FIGS. 12 and 13 are operational diagrams of a drive system of a washing machine according to an embodiment of the present disclosure.
Figure 13:
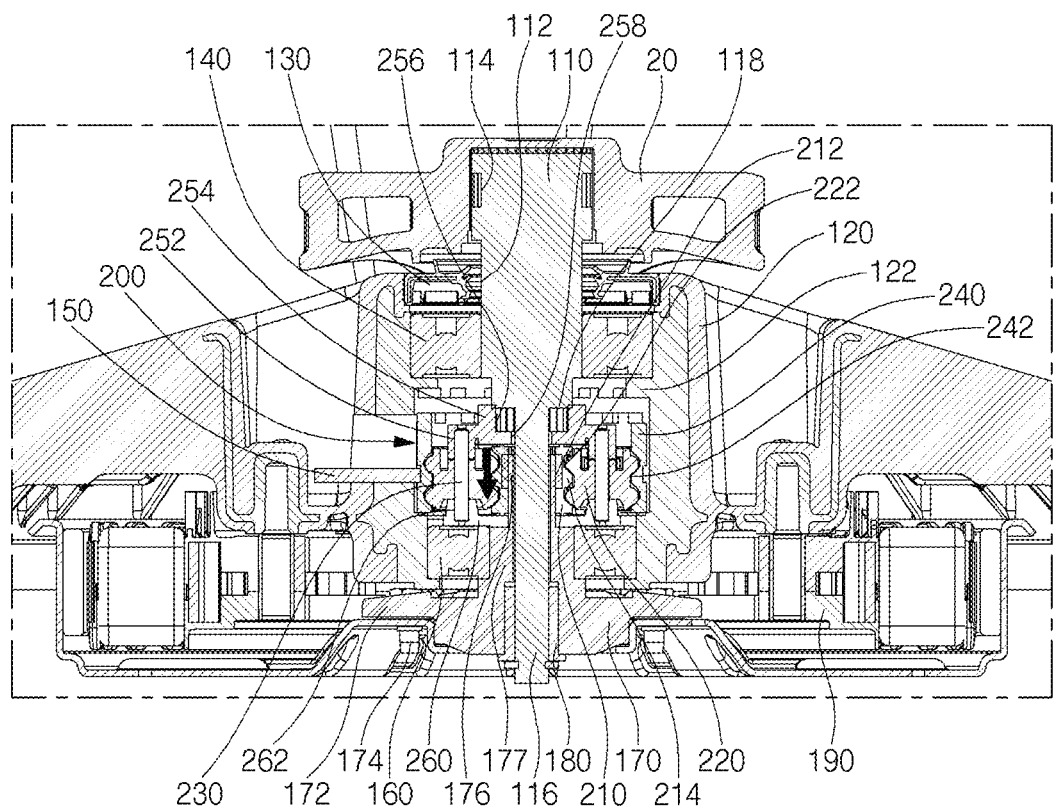

FIGS. 12 and 13 are operational diagrams of a drive system of a washing machine according to an embodiment of the present disclosure.

Referring to FIG. 12, the planetary gear set 200 is moved upward by the first actuator 150. In this case, the first clutch portion 244 of the ring gear 240 of the planetary gear set 200 may be engaged with and fixed to the second clutch portion 124 of the housing 120. With the ring gear 240 fixed, as the rotor shaft 170 rotates, the sun gear 210 rotates, and the sun gear 210 causes the pinion gear 220 to rotate and revolve. In this case, the rotational force of the rotor shaft 170 is reduced at a gear ratio of n:1 and transmitted to the output shaft 110 so that the output shaft 110 rotates at low speed and high torque.

Referring to FIG. 13, the planetary gear set 200 is moved downward by the first actuator 150. In this case, the third clutch portion 264 of the second carrier 260 of the planetary gear set 200 is engaged with the fourth clutch portion 179 of the rotor shaft 170, and the plurality of pinion gears 220 connected to the second carrier 260 do not rotate but revolve. The planetary gear set 200 transmits the rotational force of the rotor shaft 170 to the output shaft 110 at a ratio of 1:1 so that the output shaft 110 rotates at high speed and low torque.

According to the drive system 100 of the washing machine according to an embodiment of the present disclosure, it is possible to implement the washing mode and the spin-drying mode by moving the entire planetary gear set 200 without a stop operation between ending washing and starting spin-drying.

Figure 14:
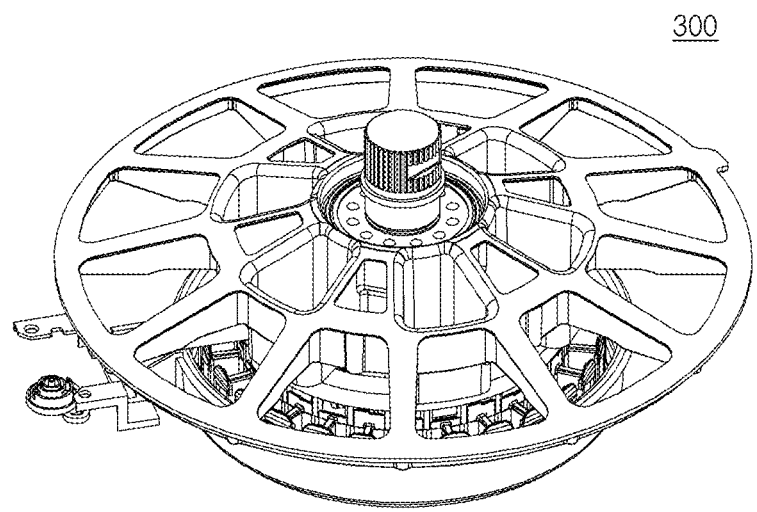
FIG. 14 is a perspective view of a drive system of a washing machine according to another embodiment of the present disclosure.
Figure 15:
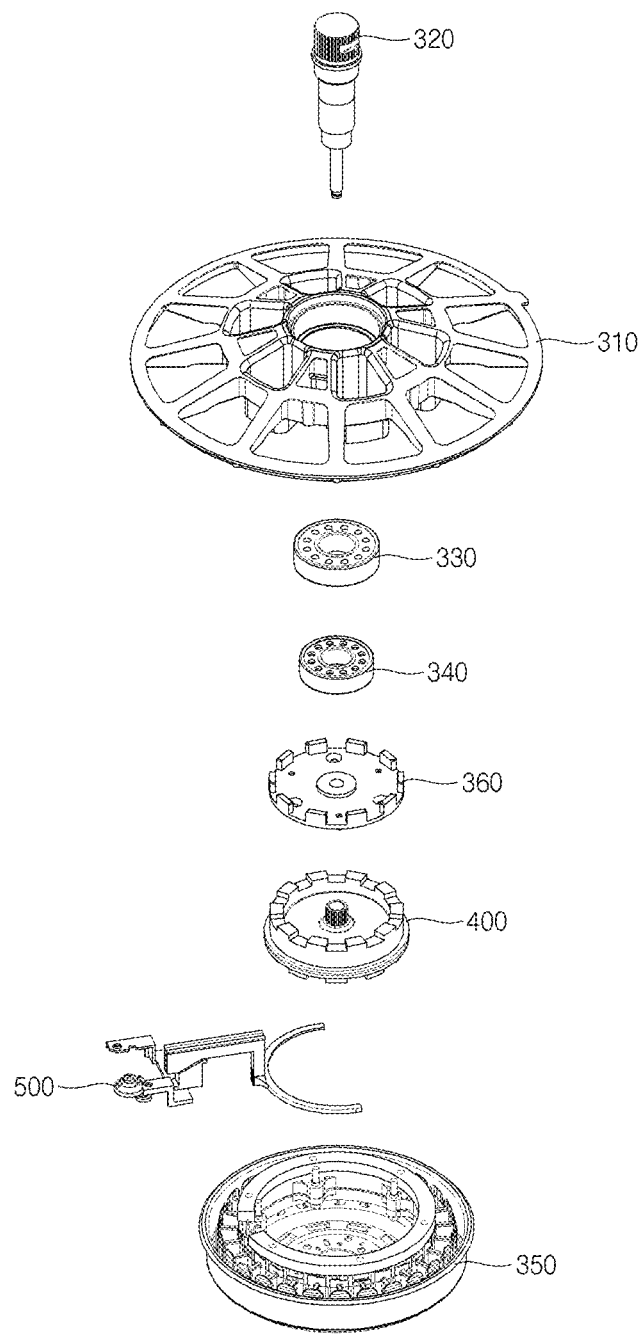
FIG. 15 is an exploded perspective view of a drive system of a washing machine according to another embodiment of the present disclosure.
Figure 16:
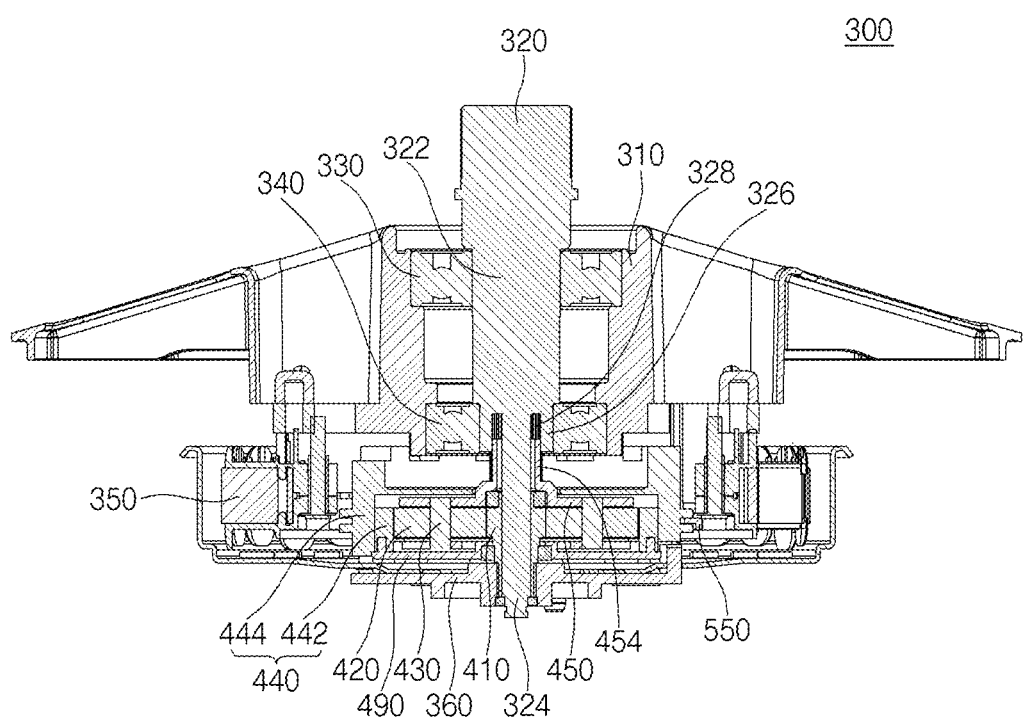
FIG. 16 is a cross-sectional view of a drive system of a washing machine according to another embodiment of the present disclosure.
Figure 17:
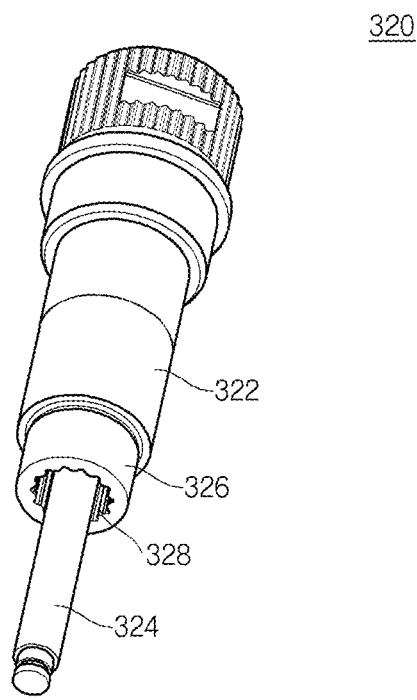
FIG. 17 is a perspective view of an output shaft of a drive system of a washing machine according to another embodiment of the present disclosure.
Figure 18:
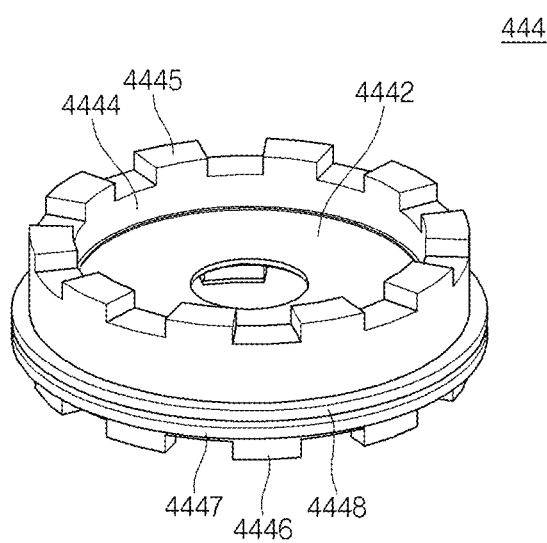
FIG. 18 is a perspective view of a part of a ring gear of a drive system of a washing machine according to another embodiment of the present disclosure.
Figure 19:
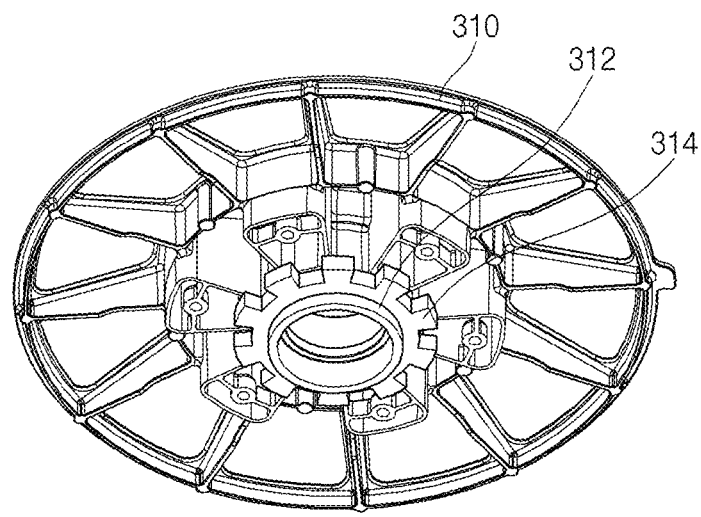
FIG. 19 is a perspective view of a housing of a drive system of a washing machine according to another embodiment of the present disclosure.
Figure 20:
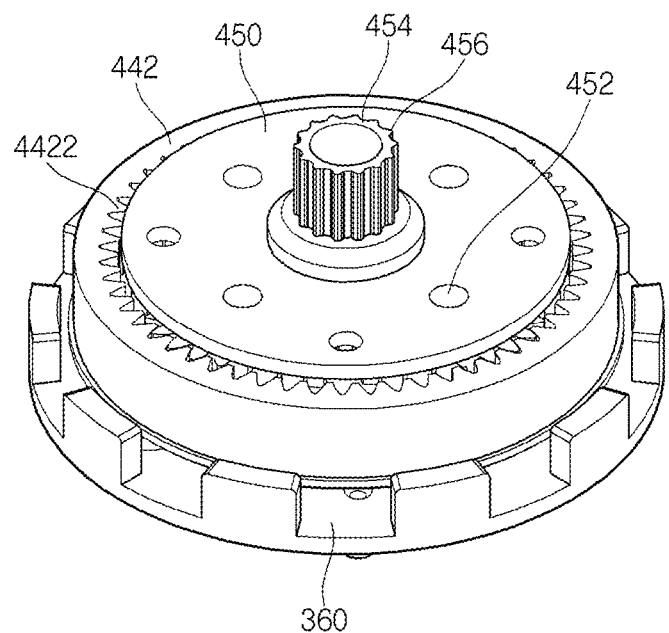
FIG. 20 is a perspective view of a part of a planetary gear set and a rotor of a drive system of a washing machine according to another embodiment of the present disclosure.
Figure 21:
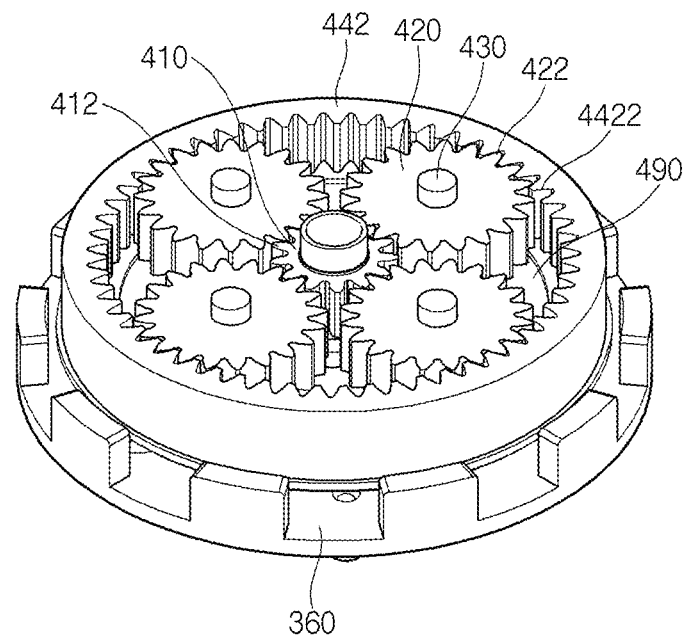
FIG. 21 is a view in which the third carrier is removed from FIG. 20.
Figure 22:
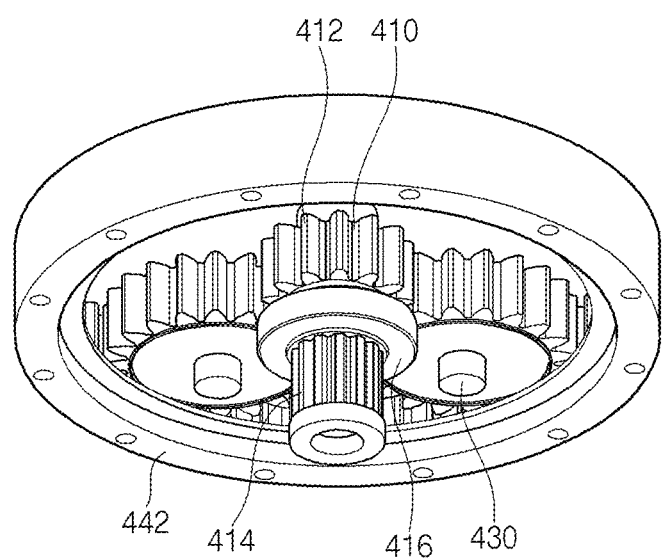
FIG. 22 is a perspective view of a part of a planetary gear set of a drive system of a washing machine according to another embodiment of the present disclosure.
Figure 23:
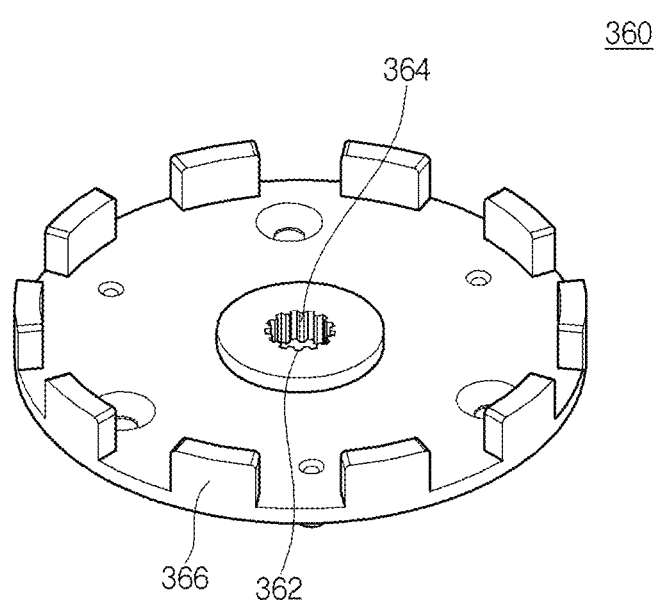
FIG. 23 is a perspective view of a rotor of a drive system of a washing machine according to another embodiment of the present disclosure.
Figure 24:
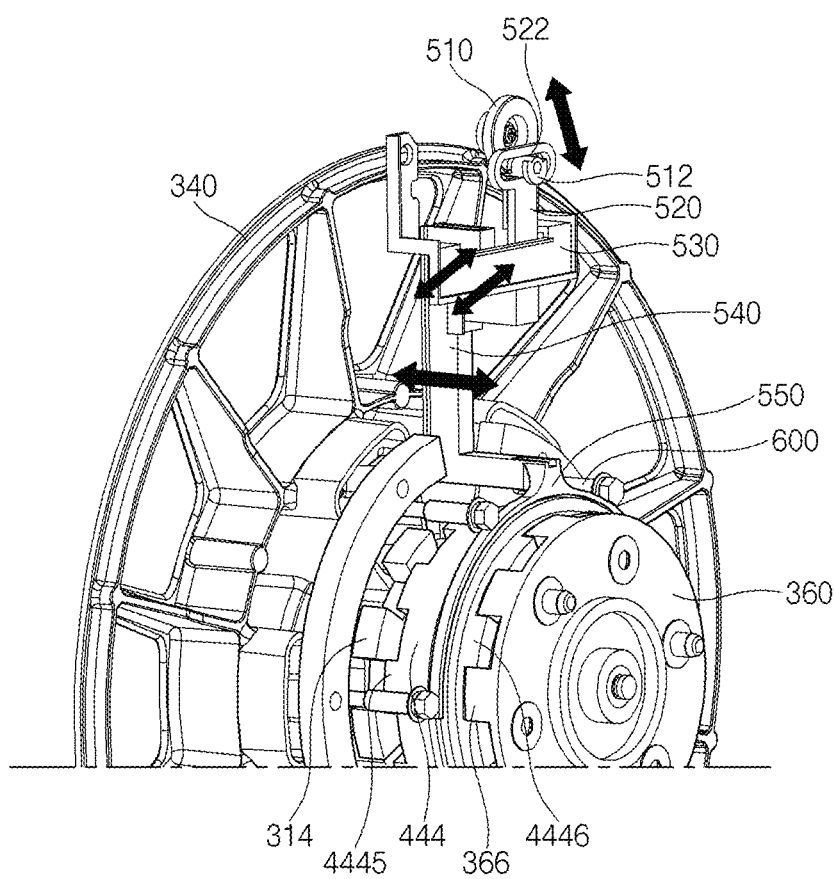
FIGS. 24 to 27 are operation diagrams of actuators of a drive system of a washing machine according to another embodiment of the present disclosure.
Figure 25:
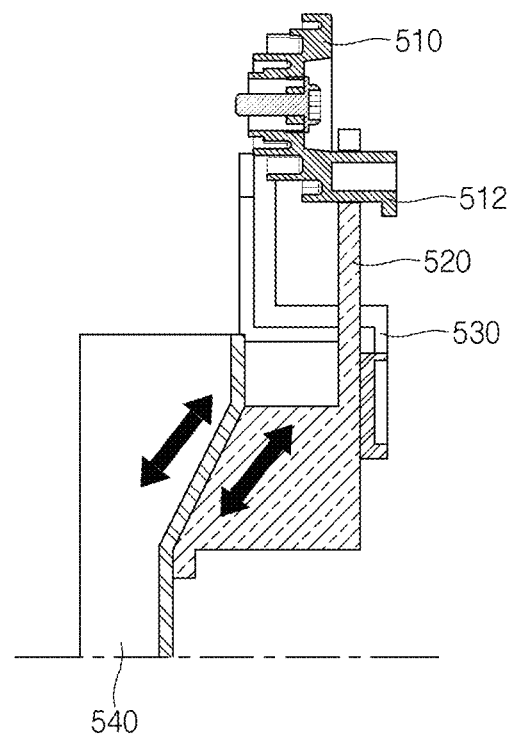
Figure 26:
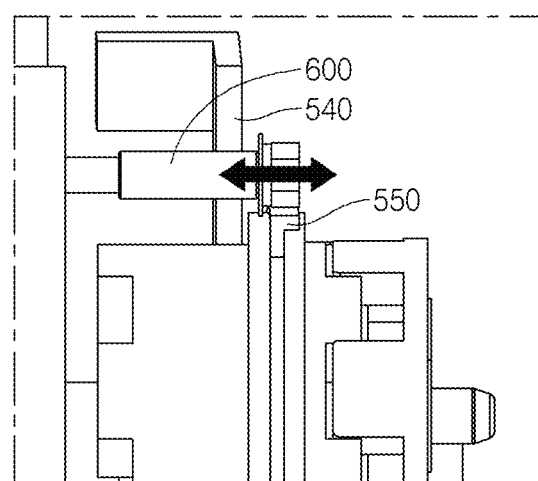
Figure 27:
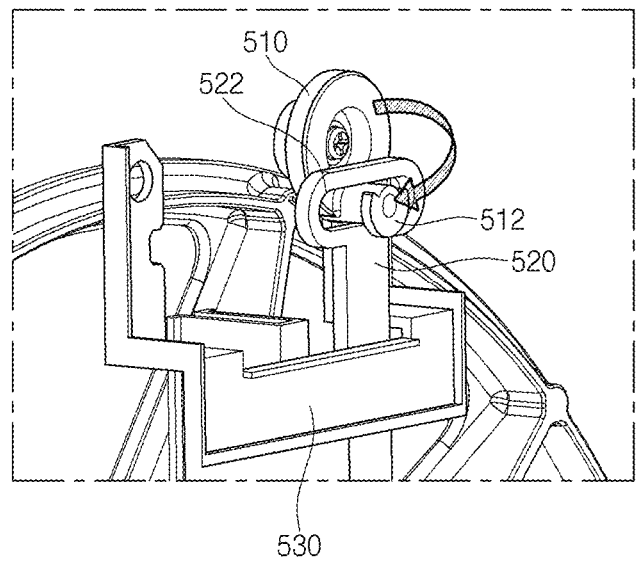

FIG. 14 is a perspective view of a drive system of a washing machine according to another embodiment of the present disclosure. FIG. 15 is an exploded perspective view of a drive system of a washing machine according to another embodiment of the present disclosure. FIG. 16 is a cross-sectional view of a drive system of a washing machine according to another embodiment of the present disclosure. FIG. 17 is a perspective view of an output shaft of a drive system of a washing machine according to another embodiment of the present disclosure. FIG. 18 is a perspective view of a part of a ring gear of a drive system of a washing machine according to another embodiment of the present disclosure. FIG. 19 is a perspective view of a housing of a drive system of a washing machine according to another embodiment of the present disclosure. FIG. 20 is a perspective view of a part of a planetary gear set and a rotor of a drive system of a washing machine according to another embodiment of the present disclosure. FIG. 21 is a view in which the third carrier is removed from FIG. 20. FIG. 22 is a perspective view of a part of a planetary gear set of a drive system of a washing machine according to another embodiment of the present disclosure. FIG. 23 is a perspective view of a rotor of a drive system of a washing machine according to another embodiment of the present disclosure.

Referring to FIGS. 14 to 23, a drive system of a washing machine 300 according to another embodiment of the present disclosure may include a housing 310, a output shaft 320, a third bearing 330, a fourth bearing 340, a planetary gear set 400, a second actuator 500, a rotor 360, and a motor 350, but may be implemented except for some of these configurations, and does not exclude other additional configurations.

The output shaft 320 may be rotatably disposed in the housing 310. The pulsator 20 may be disposed above the housing 310. The housing 310 may be coupled to the inner tub 10. The motor 350 may be disposed below the housing 310. The housing 310 may be coupled to the planetary gear set 400.

The housing 310 may include a cylindrical portion 312 extending downward and a sixth clutch portion 314 extending radially outward from the cylindrical portion. The sixth clutch portion 314 may be engaged with a fifth clutch portion 4445 of a ring gear 440 of the planetary gear set 400 when the planetary gear set 400 is moved to the upper part or the other side. The sixth clutch portion 314 may be formed in a shape complementary to that of the fifth clutch portion 4445.

The output shaft 320 may extend in the axial direction. The output shaft 320 may be coupled to the pulsator 20. The output shaft 320 may be rotatably coupled to the housing 310. The output shaft 320 may be bearing-coupled to the housing 310. The output shaft 320 may be rotatably coupled at the same speed as the rotor 360 or at different speeds. The output shaft 320 may be bearing-coupled to the rotor 360. In another embodiment of the present disclosure, the axial direction may be interpreted as meaning the vertical direction based on FIGS. 14 to 16.

A first region 324 of the output shaft 320 may be disposed within the planetary gear set 400. The first region 324 of the output shaft 320 may be disposed inside the rotor 360. The first region 324 of the output shaft 320 may be bearing-coupled to the rotor 360.

A second region 322 of the output shaft 320 may be disposed above the first region 324. The second region 322 of the output shaft 320 may be bearing-coupled to the housing 310. The third bearing 330 may be disposed between the second region 322 of the output shaft 320 and the housing 310. The second region 322 of the output shaft 320 may be rotatably coupled to the housing 310 by the third bearing 330. A diameter of the second region 322 of the output shaft 320 may be larger than that of the first region 324.

The protrusion 326 of the output shaft 320 may protrude downward from the lower surface of the second region 322 and be spaced apart from the first region 324 in the radial direction. The protrusion 326 of the output shaft 320 may be bearing-coupled to the housing 310. The fourth bearing 340 may be disposed between the protrusion 326 of the output shaft 320 and the housing 310. The protrusion 326 of the output shaft 320 may be rotatably coupled to the housing 310 by the fourth bearing 340. A diameter of the protrusion 326 of the output shaft 320 may be smaller than the diameter of the second region 322 and larger than a diameter of the first region 324.

A sixth spline portion 328 of the output shaft 320 may be formed on an inner circumferential surface of the protrusion 326 of the output shaft 320. The sixth spline portion 328 may be spline-coupled to a fifth spline portion 456 of a third carrier 450. Through this, it is possible to stably guide the movement of the planetary gear set 400 with respect to the output shaft 320.

The third bearing 330 may be disposed between the housing 310 and the output shaft 320. The third bearing 330 may bearing-couple the output shaft 320 to the housing 310. The third bearing 330 may rotatably couple the output shaft 320 to the housing 310. The third bearing 330 may be disposed between the second region 322 of the output shaft 320 and the housing 310. The third bearing 330 may extend in the circumferential direction.

The fourth bearing 340 may be disposed between the housing 310 and the output shaft 320. The fourth bearing 340 may bearing-couple the output shaft 320 to the housing 310. The fourth bearing 340 may rotatably couple the output shaft 320 to the housing 310. The fourth bearing 340 may be disposed between the protrusion 326 of the output shaft 320 and the housing 310. The fourth bearing 340 may extend in the circumferential direction. The fourth bearing 340 may be disposed below the third bearing 330. The fourth bearing 340 may be disposed above the planetary gear set 400.

A part of the planetary gear set 400 may be spline-coupled to the rotor 360 and another part of the planetary gear set 400 may be spline-coupled to the output shaft 320. The planetary gear set 400 may be vertically moved by the second actuator 500.

When the planetary gear set 400 is moved to one side or a lower part, a part of the planetary gear set 400 may be coupled to the rotor 360. In this case, the rotational force of the rotor 360 may be transmitted to the output shaft 320 at a ratio of 1:1.

When the planetary gear set 400 is moved to the other side or an upper part, another part of the planetary gear set 400 may be coupled to the housing 310. In this case, the rotational force of the rotor 360 may be reduced at a gear ratio of n:1 and transmitted to the output shaft 320.

Through this, it is possible to implement a washing mode and a spin-drying mode by moving the entire planetary gear set 400 without a stop operation between ending washing and starting spin-drying.

The planetary gear set 400 may include a sun gear 410, a plurality of pinion gears 420, a ring gear 440, a connection portion 430, and carriers 450 and 490.

The sun gear 410 may be spline-coupled to the rotor 360. Specifically, a seventh spline portion 414 formed on an outer circumferential surface of a region extending downward of the sun gear 410 may be spline-coupled to an eighth spline portion 364 formed on an inner circumferential surface of the rotor 360. FIGS. 21 and 22 show that the outer circumferential surface of the sun gear 410 is the spur gear 412 as an example, but a fourth helical gear may be formed on the outer circumferential surface of the sun gear 410.

The plurality of pinion gears 420 may be spaced apart from each other in the circumferential direction. The outer circumferential surfaces of the plurality of pinion gears 420 may be coupled to the outer circumferential surfaces of the sun gear 410, respectively. FIGS. 21 and 22 show that the outer circumferential surface of the plurality of pinion gears 420 are the spur gears 422 as an example, but a fifth helical gear may be formed on the outer circumferential surface of the plurality of pinion gears 420.

Another embodiment of the present disclosure has been described as an example in which the number of the plurality of pinion gears 420 is four, but the number of the plurality of pinion gears 420 may be variously changed without being limited thereto.

A plurality of connection portions 430 may be formed in each of the plurality of pinion gears 420. The plurality of pinion gears 420 may be connected to the carriers 450 and 490 through the connection portion 430.

The ring gear 440 may include an inner portion 442 and an outer portion 444.

An inner circumferential surface of the inner portion 442 of the ring gear 440 may be coupled to the plurality of pinion gears 420. FIGS. 21 and 22 show the inner circumferential surface of the ring gear 440 is a spur gear 4422 as an example, but a sixth helical gear may be formed on the inner circumferential surface of the ring gear 440.

The outer portion 444 of the ring gear 440 may include a disk portion 4442, a vertical portion 4444 extending in the axial direction from the outer side in the radial direction of the disk portion, a fifth clutch portion 4445 formed on an upper surface of the vertical portion 4444, a seventh clutch portion 4446 formed on a lower surface of the vertical portion 4444, a horizontal portion 4447 protruding outward in the radial direction and extending in the circumferential direction from the vertical portion 4444, and an actuator groove 4448 concavely formed inward in the radial direction from the horizontal portion 4447.

The fifth clutch portion 4445 may be formed on an upper surface of the ring gear 440. The fifth clutch portion 4445 may be engaged with the sixth clutch portion 314 of the housing 310 when the planetary gear set 400 moves upward. Through this, since the rotation of the ring gear 440 is stopped without additional parts, it is possible to implement low-speed and high-torque washing mode of n:1.

The seventh clutch portion 4446 may be formed on a lower surface of the ring gear 440. The seventh clutch portion 4446 may be engaged with an eighth clutch portion 366 formed on an upper surface of the rotor 360 when the planetary gear set 400 moves downward. Through this, since the ring gear 440 and the rotor 360 are synchronized, it is possible to implement high-speed and low-torque spin-drying mode of 1:1.

The carriers 450 and 490 may be coupled to the plurality of pinion gears 420. The carriers 450 and 490 may be coupled to the plurality of pinion gears 420 through the connection portion 430.

The second actuator 500 may be disposed in the actuator groove 4448. The actuator groove 4448 may extend in the circumferential direction. The entire planetary gear set 400 including the ring gear 440 may be moved in the vertical direction by the second actuator 500 disposed in the actuator groove 4448. Through this, it is possible to move the entire planetary gear set 400 in the vertical direction while improving space efficiency.

The carriers 450 and 490 may include a third carrier 450 disposed above the plurality of pinion gears 420 and a fourth carrier 490 disposed below the plurality of pinion gears 420. The third carrier 450 and the fourth carrier 490 may be connected to the plurality of pinion gears 420 through the connection portion 430.

The third carrier 450 may include a second coupling hole 452 to which the plurality of connection portions 430 are coupled, a through hole penetrated by the first region 324 of the output shaft 320, a protrusion region 454 protruding upward from the upper surface, and a fifth spline portion 456 formed on an outer circumferential surface of the protrusion region 454.

The fifth spline portion 456 of the third carrier 450 may be coupled to the sixth spline portion 328 of the output shaft 320. Through this, it is possible to stably guide the movement of the planetary gear set 400 with respect to the output shaft 320.

The fourth helical gear may be formed on the outer circumferential surface of the sun gear 410, the fifth helical gear may be formed on an outer circumferential surface of the plurality of pinion gears 420, and the sixth helical gear may be formed on an inner circumferential surface of the ring gear 440. Since the planetary gear set 400 moves in the vertical direction as a whole, helical gears may be formed at the sun gear 410, the plurality of pinion gears 420, and the ring gear 440. Through this, it is possible to increase the safety factor of the gears provided in the planetary gear set 400, and reduce the noise generated during gear rotation.

The planetary gear set 400 may be disposed below the third bearing 330 and the fourth bearing 340. Since two bearings support the output shaft 320 connected to the washing machine tub, rotational stability of the output shaft 320 may be improved.

The rotor 360 may be coupled to the motor 350. The rotor 360 may include a disk portion coupled to the motor 350, an eighth clutch portion 366 protruding upward from the outside in the radial direction of the disk portion, a spline protrusion 362 protruding upward from a central region of the disk portion, and an eighth spline portion 364 formed on an inner circumferential surface of the spline protrusion 362.

The eighth clutch portion 366 may be coupled to the seventh clutch portion 4446 formed on the lower surface of the ring gear 440. Through this, when the planetary gear set 400 is moved downward, the seventh clutch portion 4446 is coupled to the eighth clutch portion 366 to rotate integrally.

The eighth spline portion 364 may be formed on the inner circumferential surface of the rotor 360. Specifically, the eighth spline portion 364 may be formed on the inner circumferential surface of the spline protrusion 362. The eighth spline portion 364 may be spline-coupled to the seventh spline portion 414 formed on the outer circumferential surface of the sun gear 410. Through this, it is possible to stably guide the movement of the planetary gear set 400 with respect to the rotor 360.

The motor 350 may be disposed on one side of the housing 310. The motor 350 may be disposed below the housing 310. The motor 350 may be coupled to the rotor 360. The motor 350 may receive power from the outside and rotate in one direction or the other direction to rotate the rotor 360 in one direction or the other direction.

FIGS. 24 to 27 are operation diagrams of actuators of a drive system of a washing machine according to another embodiment of the present disclosure.

Referring to FIGS. 24 to 27, the second actuator 500 may include a driving portion 510, a first connecting rod 520, a bracket 530, a second connecting rod 540, and a fork portion 550. A driving protrusion 512 of the driving portion 510 is inserted into a driving hole 522 of the first connecting rod 520. When the driving protrusion 512 of the driving portion 510 rotates in one direction, the first connecting rod 520 is moved in the horizontal direction by the fixed bracket 530, and the fork portion 550 is moved vertically or axially by the second connecting rod 540 connected to the first connecting rod 520. The planetary gear set 400 is moved vertically or axially by the fork portion 550 inserted into the actuator groove 4448. The fork portion 550 other than a region connected to the second connecting rod 540 may be connected to a support portion 600 connected to the housing 310.

The first actuator 150 described above may be the same as the second actuator 500. However, the description of the second actuator 500 is only an example, and if the planetary gear set 400 can be moved in the vertical direction, the second actuator 500 can be changed to an actuator applicable to those skilled in the art.

Figure 28:
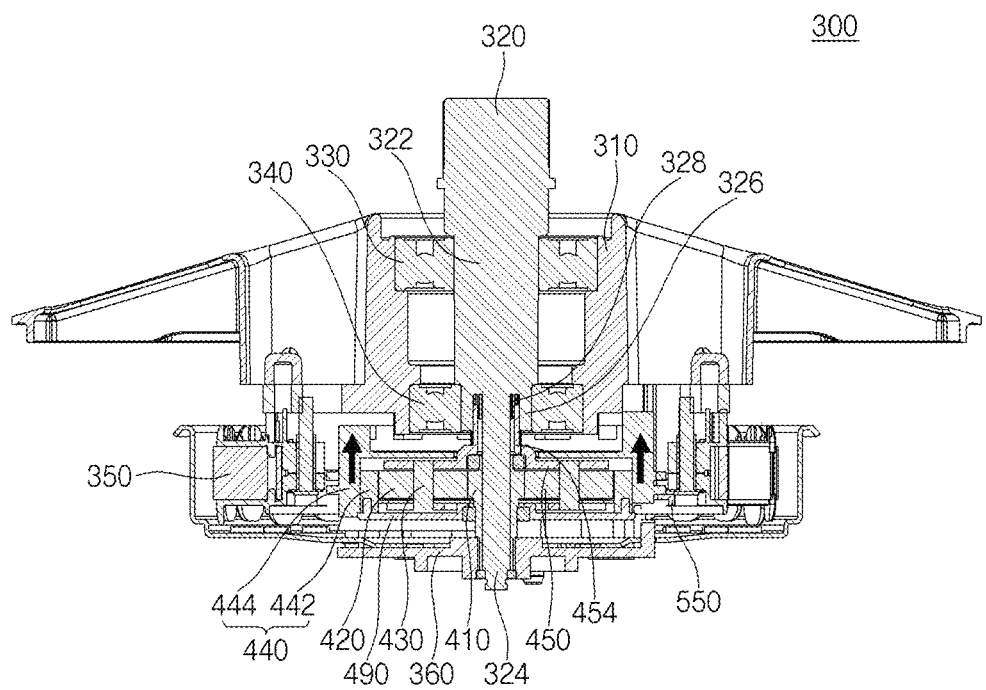
FIGS. 28 and 29 are operational diagrams of a drive system of a washing machine according to another embodiment of the present disclosure.
Figure 29:
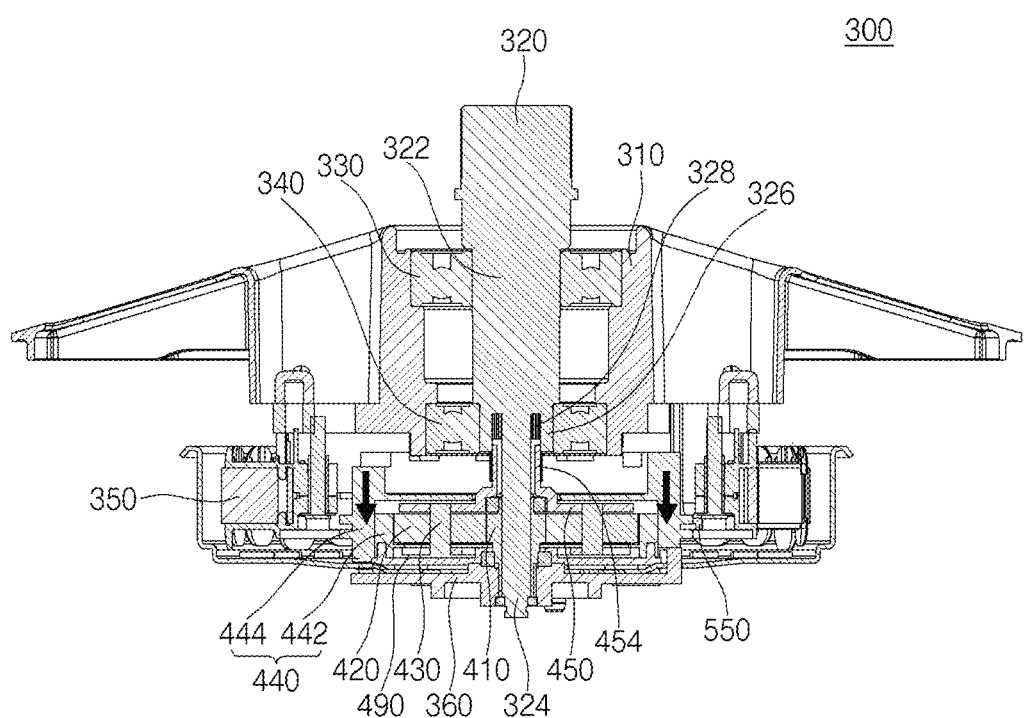

FIGS. 28 and 29 are operational diagrams of a drive system of a washing machine according to another embodiment of the present disclosure.

Referring to FIG. 28, the planetary gear set 400 is moved upward by the second actuator 500. In this case, the fifth clutch portion 4445 of the ring gear 440 of the planetary gear set 400 may be engaged with and fixed to the sixth clutch portion 314 of the housing 310. With the ring gear 440 fixed, as the rotor 360 rotates, the sun gear 410 rotates, and the sun gear 410 causes the pinion gear 420 to rotate and revolve. In this case, the rotational force of the rotor 360 is reduced at a gear ratio of n:1 and transmitted to the output shaft 320 so that the output shaft 320 rotates at low speed and high torque.

Referring to FIG. 29, the planetary gear set 400 is moved downward by the second actuator 500. In this case, the seventh clutch portion 4446 of the ring gear 440 of the planetary gear set 400 is engaged with the eighth clutch portion 366 of the rotor 360, and while the ring gear 440 rotates together with the rotor 360, the plurality of pinion gears 420 do not rotate but revolve. The planetary gear set 400 transmits the rotational force of the rotor 360 to the output shaft 320 at a ratio of 1:1 so that the output shaft 320 rotates at high speed and low torque.

According to the drive system of the washing machine 300 according to another embodiment of the present disclosure, it is possible to implement the washing mode and the spin-drying mode by moving the entire planetary gear set 400 without a stop operation between ending washing and starting spin-drying.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A system configured to drive a washing machine, the system comprising:
    a housing;
    a motor disposed at a side of the housing;
    a rotor shaft coupled to the motor and the housing;
    an output shaft coupled to the housing, at least a part of the output shaft being disposed in the rotor shaft;
    a planetary gear set comprising (i) a first portion coupled to the rotor shaft and (ii) a second portion coupled to the output shaft; and
    an actuator configured to move the planetary gear set along a vertical direction,
    wherein the planetary gear set is configured to:
        based on the actuator moving the planetary gear set to a first side along the vertical direction to thereby couple a part of the planetary gear set to the rotor shaft, transmit a rotational force of the rotor shaft to the output shaft with a first gear ratio, and
        based on the actuator moving the planetary gear set to a second side along the vertical direction to thereby couple another part of the planetary gear set to the housing, reduce and transmit the rotational force of the rotor shaft to the output shaft with a second gear ratio different from the first gear ratio.

2. The system of claim 1, wherein the planetary gear set comprises:
    a sun gear coupled to the rotor shaft;
    a plurality of pinion gears spaced apart from one another in a circumferential direction and coupled to an outer circumferential surface of the sun gear;
    a ring gear having an inner circumferential surface coupled to the plurality of pinion gears; and
    a carrier coupled to the plurality of pinion gears.

3. The system of claim 2, wherein the ring gear comprises a first clutch portion disposed at an upper surface of the ring gear, and
    wherein the housing comprises a second clutch portion configured to couple to the first clutch portion based on the planetary gear set being moved to the second side.

4. The system of claim 2, wherein the carrier comprises:
    a first carrier disposed at the plurality of pinion gears;

a second carrier disposed below the plurality of pinion gears in the vertical direction; and a plurality of connecting portions that connect each of the plurality of pinion gears to the first carrier and the second carrier.

5. The system of claim 4, wherein the first carrier comprises a first spline portion disposed at an inner circumferential surface of the first carrier, and wherein the output shaft comprises a second spline portion disposed at an outer circumferential surface of the output shaft and coupled to the first spline portion.

6. The system of claim 4, wherein the second carrier comprises a third clutch portion disposed at a lower surface of the second carrier, and wherein the rotor shaft comprises a fourth clutch portion configured to couple to the third clutch portion based on the planetary gear set being moved to the first side.

7. The system of claim 2, wherein the sun gear comprises a third spline portion disposed at an inner circumferential surface of the sun gear, and wherein the rotor shaft comprises a fourth spline portion disposed at an outer circumferential surface of the rotor shaft and connected to the third spline portion.

8. The system of claim 2, wherein each of the sun gear, the plurality of pinion gears, and the ring gear comprises one or more helical gears.

9. The system of claim 1, further comprising:

a first bearing disposed between the output shaft and the housing; and a second bearing spaced apart from the first bearing in the vertical direction and disposed between the rotor shaft and the housing, wherein the planetary gear set is disposed between the first bearing and the second bearing.

10. The system of claim 1, further comprising a bushing disposed between at least the part of the output shaft and the rotor shaft.

11. A system configured to drive a washing machine, the system comprising:

a housing;

a motor disposed at a side of the housing;

a rotor coupled to the motor;

an output shaft coupled to the housing, at least a part of the output shaft being disposed within the rotor;

a planetary gear set comprising (i) a first portion coupled to the rotor and (ii) a second portion coupled to the output shaft; and an actuator configured to move the planetary gear set along a vertical direction, wherein the planetary gear set is configured to:

based on the actuator moving the planetary gear set to a first side along the vertical direction to thereby couple a part of the planetary gear set to the rotor, transmit a rotational force of the rotor to the output shaft with a first gear ratio, and based on the actuator moving the planetary gear set to a second side along the vertical direction to thereby couple another part of the planetary gear set to the housing, reduce and transmit the rotational force of the rotor to the output shaft with a second gear ratio different from the first gear ratio.

12. The system of claim 11, wherein the planetary gear set comprises:

a sun gear coupled to the rotor;

a plurality of pinion gears spaced apart from one another in a circumferential direction and coupled to an outer circumferential surface of the sun gear;

a ring gear having an inner circumferential surface coupled to the plurality of pinion gears; and a carrier coupled to the plurality of pinion gears.

13. The system of claim 12, wherein the ring gear comprises a fifth clutch portion that is disposed at an upper surface of the ring gear, and wherein the housing comprises a sixth clutch portion that is configured to couple to the fifth clutch portion based on the planetary gear set being moved to the second side.

14. The system of claim 12, wherein the carrier comprises:

a third carrier disposed at the plurality of pinion gears;

a fourth carrier disposed below the plurality of pinion gears; and a plurality of connecting portions that connect each of the plurality of pinion gears to the third carrier and the fourth carrier.

15. The system of claim 14, wherein the third carrier comprises a fifth spline portion disposed at an outer circumferential surface of the third carrier, and wherein the output shaft comprises:

a first region disposed at the planetary gear set;

a second region disposed at the first region;

a protrusion that protrudes downward from a lower surface of the second region and is spaced apart from the first region; and a sixth spline portion disposed at an inner circumferential surface of the protrusion and coupled to the fifth spline portion.

16. The system of claim 15, further comprising:

a third bearing disposed between the second region and the housing; and a fourth bearing disposed between the protrusion and the housing, wherein the planetary gear set is disposed below the fourth bearing.

17. The system of claim 14, wherein the ring gear comprises a seventh clutch portion disposed at a lower surface of the ring gear, and wherein the rotor comprises an eighth clutch portion configured to couple to the seventh clutch portion based on the planetary gear set being moved to the first side.

18. The system of claim 12, wherein the sun gear comprises a seventh spline portion disposed at an outer circumferential surface of the ring gear, and Wherein the rotor comprises an eighth spline portion disposed at an inner circumferential surface of the rotor and connected to the seventh spline portion.

19. The system of claim 12, wherein each of the sun gear, the plurality of pinion gears, and the ring gear comprises one or more helical gears.

20. The system of claim 12, wherein the ring gear defines a groove at an outer circumferential surface of the ring gear, and wherein the actuator is disposed in the groove.

* * * * *